United States Patent
Hu et al.

(10) Patent No.: US 11,150,077 B2
(45) Date of Patent: Oct. 19, 2021

(54) HETERODYNE LASER INTERFEROMETER BASED ON INTEGRATED SECONDARY BEAM SPLITTING COMPONENT

(71) Applicant: HARBIN INSTITUTE OF TECHNOLOGY, Harbin (CN)

(72) Inventors: Pengcheng Hu, Harbin (CN); Xiaobo Su, Harbin (CN); Haijin Fu, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 17/002,845

(22) Filed: Aug. 26, 2020

(65) Prior Publication Data

US 2020/0386533 A1 Dec. 10, 2020

(30) Foreign Application Priority Data

Mar. 2, 2020 (CN) .......................... 202010134345.1

(51) Int. Cl.
*G01B 9/02* (2006.01)
*G02B 27/12* (2006.01)

(52) U.S. Cl.
CPC ..... *G01B 9/02007* (2013.01); *G01B 9/02017* (2013.01); *G01B 9/02019* (2013.01);
(Continued)

(58) Field of Classification Search
CPC ............ G01B 9/02007; G01B 9/02019; G01B 9/02017; G01B 9/02049; G01B 9/02028;
(Continued)

(56) References Cited

U.S. PATENT DOCUMENTS

2002/0191191 A1* 12/2002 Bockman ................. G02B 5/04
356/493
2006/0087657 A1* 4/2006 Holmes .............. G01B 9/02058
356/487

(Continued)

*Primary Examiner* — Jonathan M Hansen
(74) *Attorney, Agent, or Firm* — IPro, PLLC

(57) ABSTRACT

Disclosed is a heterodyne laser interferometer based on an integrated secondary beam splitting component, which belongs to the technical field of laser application; the disclosure inputs two beams that are spatially separated and have different frequencies to the heterodyne laser interferometer based on the integrated secondary beam splitting component, wherein the integrated secondary beam splitting component includes two beam splitting surfaces that are spatially perpendicular to each other; and the two beam splitting surfaces are plated with a polarizing beam splitting film or a non-polarizing beam splitting film, and a measurement beam and a reference beam are the same in travel path length in the integrated secondary beam splitting component. The heterodyne laser interferometer of the disclosure significantly reduces periodic nonlinear errors, has the advantages of simple structure, good thermal stability, large tolerance angle and easy integration and assembly compared with other existing heterodyne laser interferometers with spatially separated optical paths, and meets the high-precision and high-resolution requirements of high-end equipment on heterodyne laser interferometry.

3 Claims, 1 Drawing Sheet

(52) U.S. Cl.
CPC ..... *G01B 9/02028* (2013.01); *G01B 9/02049* (2013.01); *G02B 27/126* (2013.01); *G01B 2290/20* (2013.01); *G01B 2290/70* (2013.01)

(58) Field of Classification Search
CPC ............ G01B 2290/20; G01B 2290/70; G01B 9/02051; G01B 9/02018; G01B 9/02003; G01B 9/02027; G01B 9/02062; G02B 27/126

See application file for complete search history.

(56) References Cited

U.S. PATENT DOCUMENTS

| | | | | |
|---|---|---|---|---|
| 2009/0109442 | A1* | 4/2009 | Felix | G01B 9/02018 356/491 |
| 2012/0257169 | A1* | 10/2012 | Liu | H04N 9/3167 353/20 |
| 2014/0219608 | A1* | 8/2014 | Sorin | G02B 27/141 385/48 |
| 2021/0088801 | A1* | 3/2021 | Schultz | G02B 27/285 |

* cited by examiner

HETERODYNE LASER INTERFEROMETER BASED ON INTEGRATED SECONDARY BEAM SPLITTING COMPONENT

TECHNICAL FIELD

The disclosure relates to the technical field of laser application, and mainly relates to a heterodyne laser interferometer based on an integrated secondary beam splitting component.

BACKGROUND

Due to high anti-interference ability, high signal-to-noise ratio, high precision and the like, heterodyne laser interferometers are widely applied to high-end equipment such as ultra-precision numerically-controlled machine tools, lithography machines, and coordinate measuring machines. With the continuous development of high-end equipment engineering, the existing equipment has higher and higher requirements on the measurement accuracy and resolution of heterodyne laser interferometry.

In the heterodyne laser interferometry, nano-scale periodic nonlinear errors severely limit the further improvement of the measurement accuracy and resolution. Domestic and foreign researches have shown that the periodic nonlinear errors result from optical aliasing in an interference optical path, and traditional heterodyne laser interferometers cannot avoid the optical aliasing. Therefore, scholars from various countries have changed their research thought and proposed a heterodyne laser interference technology based on spatially separated optical paths. That is, the optical aliasing is reduced or eliminated through spatially separated beam transmission, so as to reduce or even eliminate the periodic nonlinear errors.

Based on the design concept of the spatially separated optical paths, the domestic and foreign scholars have successively developed different types of heterodyne laser interferometers, which have significantly reduced periodic nonlinear errors, but still have certain limitations.

A heterodyne laser interferometer developed by foreign scholar John Lawall et al. (Michelson Interferometry with 10 pm Accuracy. Rev. Sci. Instrum., 2000, 71(7): 2669-2676) is complex in device, and complicated in composition, and a measurement beam is deflected by a target plane mirror only once, which causes that the contrast of an interference signal is easily affected by angular swing of the target plane mirror. That is, a tolerance angle is small, and optical lengths of a measurement beam and a reference beam are unbalanced, which causes poor thermal stability of the heterodyne laser interferometer, so that the heterodyne laser interferometer cannot be widely used.

A heterodyne laser interferometer designed by Taiwan scholar Wu Chien-ming et al. (Heterodyne Interferometer with Subatomic Periodic Nonlinearity. Appl. Opt., 1999, 38(19): 4089-4094) is extremely complex in composition, and difficult to integrate and assemble, and a measurement beam is also reflected by a target plane mirror only once, which causes that the contrast of an interference signal is easily affected by angular swing of the target plane mirror. That is, a tolerance angle is small, and there is also the problem of poor thermal stability caused by unbalanced optical lengths.

A heterodyne laser interferometer designed by German scholar Christoph Weichert et al. (A Heterodyne Interferometer with Periodic Nonlinearities Smaller than ±10 pm. Meas. Sci. Technol., 2012, 23(9): 094005-094011) has good thermal stability, but is complex in structure, and difficult in element customization and integration and assembly, and a measurement beam is also reflected by a target plane mirror only once, which causes that the contrast of an interference signal is easily affected by angular swing of the target plane mirror. That is, a tolerance angle is small, so that the heterodyne laser interferometer is also not easy to popularize.

A heterodyne laser interferometer developed by another foreign scholar Steven R. Gillmer et al. (Development of a Novel Fiber-Coupled Three Degree-of-Freedom Displacement Interferometer. University of Rochester Master Thesis, 2013) is simple and symmetrical in structure and has good thermal stability, but a measurement beam is also reflected by a target plane mirror only once, which also causes that the contrast of an interference signal is easily affected by angular swing of the target plane mirror. That is, a tolerance angle is small, so that the heterodyne laser interferometer is also not easy to popularize.

In addition, Korean scholar Ki-Nam Joo et al. developed a novel heterodyne laser interferometer with spatially separated optical paths in patent WO2010030179A1, but the heterodyne laser interferometer has the characteristics of good thermal stability and large tolerance angle only when a cube-corner prism is selected as a measured target mirror. Later, Jonathan D. Ellis et al. changed the target cube-corner prism to a target plane mirror (Fiber-coupled displacement interferometry without periodic nonlinearity. Optics Letters, 2011, 36(18):3584-3586.), but its structure is complex and optical lengths of a measurement beam and a reference beam are unbalanced, which causes poor thermal stability, so that the heterodyne laser interferometer is also not easy to popularize. Hu Pengcheng et al. from Harbin Institute of Technology proposed an improvement for this problem (Highly stable heterodyne interferometer without periodic nonlinearity. Technisches Messen: Sensoren, Gerate, Systeme, 2014.), which makes a total optical length of the measurement beam and the reference beam in multiple beam splitting components be balanced, and improves the thermal stability, but the improved heterodyne laser interferometer is more complex in structure, and more difficult to integrate and assemble, and is thus not easy to promote.

Based on the above, the existing heterodyne laser interferometers with spatially separated optical paths are difficult to meet the requirements of good thermal stability and large tolerance angle at the same time, which severely limits the improvement of the measurement capability of the heterodyne laser interferometers.

SUMMARY

The disclosure is directed to a heterodyne laser interferometer based on an integrated secondary beam splitting component in view of the shortcomings of existing heterodyne laser interferometers with spatially separated optical paths, so as to realize the purpose of comprehensively improving the measurement accuracy and measurement resolution of heterodyne laser interferometry.

The objective of the disclosure is achieved through the following technical solutions.

(1) A first input beam enters an integrated secondary beam splitting component and is then divided into a first measurement beam and a first reference beam; a second input beam enters the integrated secondary beam splitting component and is then divided into a second measurement beam and a second reference beam; at least one of the first measurement beam and the second measurement beam is reflected by a target plane mirror at least once; the first and second measurement beams as well as the first and second reference beams are all transmitted or reflected by a first beam splitting surface and a second beam splitting surface of the integrated secondary beam splitting component multiple times; and at least parts of the first measurement beam and the second reference beam overlap in an output travel path and form a first interference signal, and at least parts of the first reference beam and the second measurement beam overlap in an output travel path and form a second interference signal.

(2) The integrated secondary beam splitting component includes a first isosceles right-angled prism, a second isosceles right-angled prism, and a third isosceles right-angled prism. The first isosceles right-angled prism and the second isosceles right-angled prism are the same in size and form a combined isosceles right-angled prism having a same size as that of the third isosceles right-angled prism by bonding respective right-angled side surfaces to each other; a hypotenuse surface of the third isosceles right-angled prism is bonded to a hypotenuse surface of the combined isosceles right-angled prism to form a cuboid integrated secondary beam splitting component; and the bonded surfaces of the first isosceles right-angled prism and the second isosceles right-angled prism are used as the first beam splitting surface, and the bonded surfaces of the combined isosceles right-angled prism formed by the first and second isosceles right-angled prisms and the third isosceles right-angled prism are used as the second beam splitting surface.

(3) The first beam splitting surface and the second beam splitting surface are plated with a polarizing beam splitting film or a non-polarizing beam splitting film, and are spatially perpendicular to each other.

(4) The first measurement beam and the second reference beam, as well as the second measurement beam and the first reference beam are all equal in travel path length in the integrated secondary beam splitting component.

A heterodyne laser interferometer based on an integrated secondary beam splitting component of the disclosure includes a first input beam and a second input beam that are spatially non-overlapping and have different frequencies, the integrated secondary beam splitting component, a stationary reflector, and a movable target plane mirror.

The disclosure has the following characteristics and advantages.

(1) In the disclosure, the measurement beam and the reference beam of the heterodyne laser interferometer are spatially separated before final interference, such that the periodic nonlinear errors are significantly reduced; at the same time, the first measurement beam and the second reference beam, as well as the second measurement beam and the first reference beam all have the same travel path length in the integrated secondary beam splitting component, such that the thermal stability of the structure of the heterodyne laser interferometer is good; in addition, the measurement beam of the heterodyne laser interferometer is reflected by the target plane mirror twice, such that the spatial vector matching of the interference signal is enhanced, and the tolerance angle is large, and thereby the engineering practical ability is improved; and compared with other heterodyne laser interferometers with spatially separated optical paths, the heterodyne laser interferometer of the disclosure has all the above characteristics at the same time.

(2) In the disclosure, the heterodyne laser interferometer is simple in structure and easy to integrate and assemble, has good stability during mounting and use, and can led in light sources and led out the interference beam with optical fibers, which are all obvious advantages in comparison with other heterodyne laser interferometers with spatially separated optical paths.

DESCRIPTION OF REFERENCE NUMERALS IN THE FIGURES

RAP1: First isosceles right-angled prism
RAP2: Second isosceles right-angled prism
RAP3: Third isosceles right-angled prism
PBS1: First beam splitting surface
PBS2: Second beam splitting surface
WP1: First wave plate
WP2: Second wave plate
M1: Target plane mirror
M2: Reference plane mirror
FR1: First set of stationary reflectors
FR2: Second set of stationary reflectors
f1: First input beam with frequency f1
f2: Second input beam with frequency f2
Im: First interference signal
Ir: Second interference signal
PDm: First photodetector
PDr: Second photodetector

DETAILED DESCRIPTION

A preferred example of a single-axis interferometer of the disclosure will be described in detail in conjunction with the accompanying drawings below.

Figure 1:
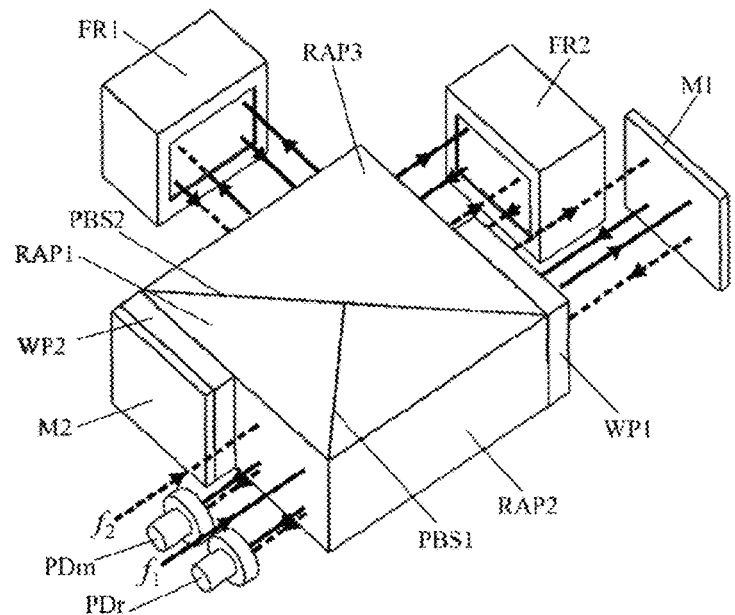
FIG. 1 is a three-dimensional schematic diagram of a single-axis structure of a heterodyne laser interferometer of the disclosure.

A single-axis heterodyne laser interferometer based on an integrated secondary beam splitting component as shown in FIG. 1, includes: a first input beam and a second input beam that are spatially non-overlapping and have different frequencies, first to third right-angled prisms RAP1-RAP3, a first set of stationary reflectors FR1 and a second set of stationary reflectors FR2, a first wave plate WP1 and a second wave plate WP2, a movable target plane mirror M1, a reference plane mirror M2, as well as a first photodetector PDm and a second photodetector PDr. The first isosceles right-angled prism and the second isosceles right-angled prism are the same in size and form a combined isosceles right-angled prism having the same size as that of the third isosceles right-angled prism by bonding respective right-angled side surfaces to each other; a hypotenuse surface of the third isosceles right-angled prism is bonded to a hypotenuse surface of the combined isosceles right-angled prism to form a cuboid integrated secondary beam splitting component; the bonded surfaces of the first isosceles right-angled prism and the second isosceles right-angled prism are used as a first beam splitting surface, and the bonded surfaces of the combined isosceles right-angled prism formed by the first and second isosceles right-angled prisms and the third isosceles right-angled prism are used as a second beam splitting surface; the first beam splitting surface and the second beam splitting surface are both plated with a polarizing beam splitting film or a non-polarizing beam splitting film, and are spatially perpendicular to each other; in addition, the first set of stationary reflectors FR1 and the second set of stationary reflectors FR2 each include at least one cube-corner prism or right-angled prism, and the relative positioning between the stationary reflectors and the integrated secondary beam splitting component should make, as much as possible, the measurement beam and the reference beam coincide in the output travel path.

Figure 2:
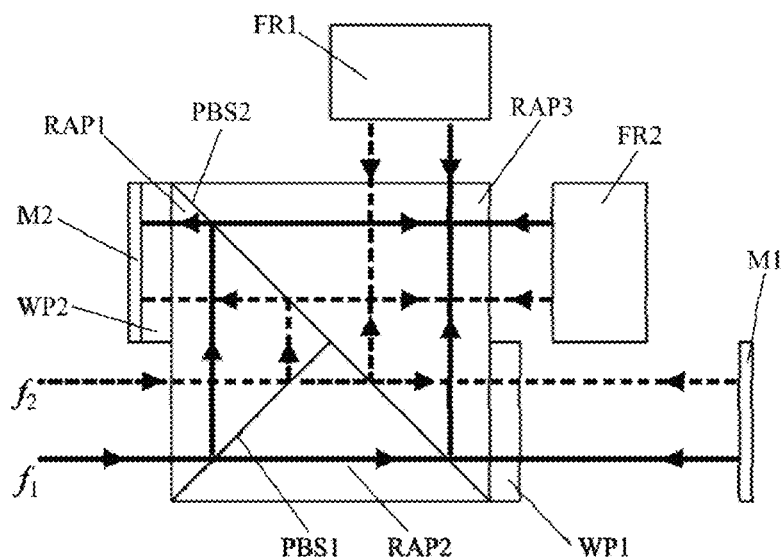
FIG. 2 is an optical path schematic diagram of a single-axis structure of a heterodyne laser interferometer of the disclosure.
Figure 3:
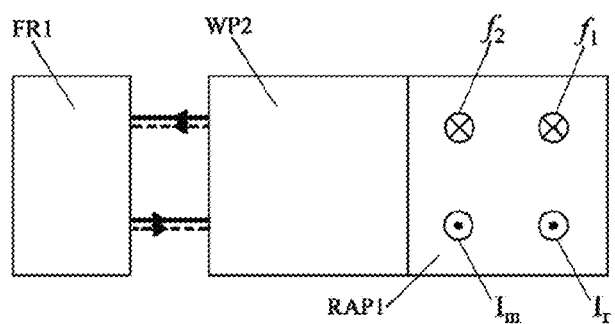
FIG. 3 is a left view of FIG. 2.

As shown in FIG. 2 and FIG. 3, the working principle of the heterodyne laser interferometer is as follows: after the first input beam enters the first beam splitting surface PBS1, its transmitted beam forms the first measurement beam, and its reflected beam forms the first reference beam; after the second input beam enters the first beam splitting surface PBS1, its transmitted beam forms the second measurement beam, and its reflected beam forms the second reference beam. The first and second measurement beams are both further transmitted through PBS2 and contact with the target plane mirror M1 twice under the polarization state transition effect of WP1 and the reflection effect of FR1, and are then transmitted and output at PBS1 carrying with double doppler frequency shift; at the same time, the first and second reference beams are both reflected and output at PBS1 under the polarization state transition effect of WP2 and the reflection effects of M2 and FR2, and the beam frequency remains constant; at least parts of the output first measurement beam and second reference beam overlap in the output travel path and form the first interference signal, and at least parts of the first reference beam and the second measurement beam overlap in the output travel path and form the second interference signal; finally, the first photodetector PDm receives the first interference signal Im; the second photodetector PDr receives the second interference signal Ir, and after signal processing of the first and second interference signals, the position change information of the target plane mirror at different degrees of freedom can be obtained.

What is claimed is:

1. A heterodyne laser interferometer based on an integrated secondary beam splitting component, comprising a first input beam and a second input beam that are spatially non-overlapping and have different frequencies, the integrated secondary beam splitting component, a stationary reflector, and a movable target plane mirror; wherein the first input beam enters the integrated secondary beam splitting component and is then divided into a first measurement beam and a first reference beam; the second input beam enters the integrated secondary beam splitting component and is then divided into a second measurement beam and a second reference beam; at least one of the first measurement beam and the second measurement beam is reflected by the target plane mirror at least once; the first and second measurement beams as well as the first and second reference beams are all transmitted or reflected by a first beam splitting surface and a second beam splitting surface of the integrated secondary beam splitting component multiple times; and at least parts of the first measurement beam and the second reference beam overlap in an output travel path and form a first interference signal, and at least parts of the first reference beam and the second measurement beam overlap in an output travel path and form a second interference signal; wherein the integrated secondary beam splitting component comprises: a first isosceles right-angled prism, a second isosceles right-angled prism, and a third isosceles right-angled prism; and wherein the first isosceles right-angled prism and the second isosceles right-angled prism are the same in size and form a combined isosceles right-angled prism having a same size as that of the third isosceles right-angled prism by bonding respective right-angled side surfaces to each other; a hypotenuse surface of the third isosceles right-angled prism is bonded to a hypotenuse surface of the combined isosceles right-angled prism to form a cuboid integrated secondary beam splitting component; and the bonded surfaces of the first isosceles right-angled prism and the second isosceles right-angled prism are used as the first beam splitting surface, and the bonded surfaces of the combined isosceles right-angled prism formed by the first and second isosceles right-angled prisms and the third isosceles right-angled prism are used as the second beam splitting surface.

2. The heterodyne laser interferometer according to claim 1, wherein the first beam splitting surface and the second beam splitting surface are plated with a polarizing beam splitting film or a non-polarizing beam splitting film, and are spatially perpendicular to each other.

3. The heterodyne laser interferometer according to claim 1, wherein the first measurement beam and the second reference beam, as well as the second measurement beam and the first reference beam are all equal in travel path length in the integrated secondary beam splitting component.

* * * * *